(12) United States Patent
Yamada et al.

(10) Patent No.: US 11,385,173 B2
(45) Date of Patent: Jul. 12, 2022

(54) LIGHT SOURCE FOR SPECTROSCOPIC ANALYSIS, SPECTROSCOPIC ANALYSIS DEVICE, AND SPECTROSCOPIC ANALYSIS METHOD

(71) Applicant: Ushio Denki Kabushiki Kaisha, Tokyo (JP)

(72) Inventors: Go Yamada, Tokyo (JP); Takuma Yokoyama, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/282,780

(22) PCT Filed: Sep. 12, 2019

(86) PCT No.: PCT/JP2019/035899
§ 371 (c)(1),
(2) Date: Apr. 5, 2021

(87) PCT Pub. No.: WO2020/075441
PCT Pub. Date: Apr. 16, 2020

(65) Prior Publication Data
US 2021/0389237 A1 Dec. 16, 2021

(30) Foreign Application Priority Data
Oct. 12, 2018 (JP) .............................. JP2018-193889

(51) Int. Cl.
*G01J 3/28* (2006.01)
*G01N 21/3563* (2014.01)
*G01N 21/3577* (2014.01)

(52) U.S. Cl.
CPC ..... *G01N 21/3563* (2013.01); *G01N 21/3577* (2013.01); *G01N 2201/06113* (2013.01); *G01N 2201/08* (2013.01)

(58) Field of Classification Search
CPC .... G01J 3/02; G01J 3/28; G01J 3/2803; G01J 3/10; G01J 3/2823
(Continued)

(56) References Cited

U.S. PATENT DOCUMENTS 8,488,125 B2    7/2013  Furusawa et al.
2013/0176563 A1* 7/2013 Ozawa ................. G01N 21/658
                                                            356/301

(Continued)

FOREIGN PATENT DOCUMENTS

| JP | 2009-273550 A | 11/2009 |
| JP | 2013-205390 A | 10/2013 |
| JP | 2017-187465 A | 10/2017 |

OTHER PUBLICATIONS

Development of Fast Near-infared Spectrometer using Chirp Pulse Light Source, Junki Sahara et al. the 78th meeting of the Society of Applied Physics Autumn Science Lecture Proceedings (2017).

(Continued)

*Primary Examiner* — Md M Rahman
(74) *Attorney, Agent, or Firm* — Kenichiro Yoshida

(57) ABSTRACT

[Object] An optimal structure for spectroscopically analyzing a solid-phase or liquid-phase sample in a wavelength range of 1100 to 1200 nm by using supercontinuum light is provided.
[Solution] Supercontinuum light generated by producing nonlinear effects in light from a pulse laser source 1 by a nonlinear element 2 and having a wavelength range including 1100 nm or greater and 1200 nm or less is subjected to pulse stretching by a pulse stretching element 3, and a solid-phase or a liquid-phase sample S is irradiated with the supercontinuum light. In the supercontinuum light, elapsed time and wavelength within one pulse are in a one-to-one correspondence, and computation means 5 computes a spec- (Continued)

trum based on a change over time in an output from a light receiver 4 that has received light that has passed through the sample S.

13 Claims, 10 Drawing Sheets

(58) Field of Classification Search
USPC .......................................................... 356/326
See application file for complete search history.

(56) References Cited

U.S. PATENT DOCUMENTS

| | | | |
|---|---|---|---|
| 2013/0222790 A1* | 8/2013 | Hirao | G01B 9/02061 356/51 |
| 2016/0047787 A1 | 2/2016 | Islam | |
| 2019/0129278 A1 | 5/2019 | Ichihara et al. | |

OTHER PUBLICATIONS

High bandwidth absorption spectroscopy with a dispersed supercontinuum source, Johan Hult et al, Optics Express, vol. 15, No. 18 (Aug. 2007).

Ren Zhibo et al, "Shot-to-shot spectrally-resolved characterization of continuous-wave-triggered supercontinuum near 1 μm", 2013 IEEE Photonics Conference, IEEE, (Sep. 8, 2013).

Hoseong Song et al, "Ultra-high-speed phase-sensitive optical coherence reflectometer with a stretched pulse supercontinuum source", Applied Optics, Optical Society of America, Washington, DC, US, vol. 50, No. 21, doi:10.1364/AO.50.004000, ISSN 0003-6935, (Jul. 20, 2011), pp. 4000-4004, (Jul. 20, 2011).

Kaminski C F et al, "Supercontinuum radiation for applications in chemical sensing and microscopy", Applied Physics B ; Lasers and Optics, Springer, Berlin, DE, (Aug. 6, 2008), vol. 92, No. 3, ISSN 1432-0649, pp. 367-378, XP019627129.

Supplementary European Search Report for EP19871348, dated Oct. 25, 2021.

\* cited by examiner (1)

| TIME WITHIN PULSE | WAVELENGTH | REFERENCE SPECTRAL DATA | MEASURED VALUE | ABSORPTION SPECTRUM |
|---|---|---|---|---|
| $t_1$ | $\lambda_1$ | $V_1$ | $v_1$ | $v_1/V_1$ |
| $t_2$ | $\lambda_2$ | $V_2$ | $v_2$ | $v_2/V_2$ |
| $t_3$ | $\lambda_3$ | $V_3$ | $v_3$ | $v_3/V_3$ |
| ⋮ | ⋮ | ⋮ | ⋮ | ⋮ |
| $t_{n-2}$ | $\lambda_{n-2}$ | $V_{n-2}$ | $v_{n-2}$ | $v_{n-2}/V_{n-2}$ |
| $t_{n-1}$ | $\lambda_{n-1}$ | $V_{n-1}$ | $v_{n-1}$ | $v_{n-1}/V_{n-1}$ |
| $t_n$ | $\lambda_n$ | $V_n$ | $v_n$ | $v_n/V_n$ |

(1)

(2)

(1)

(2)

(1)

(2)

(3)

LIGHT SOURCE FOR SPECTROSCOPIC ANALYSIS, SPECTROSCOPIC ANALYSIS DEVICE, AND SPECTROSCOPIC ANALYSIS METHOD

TECHNICAL FIELD

The invention of this application relates to a spectroscopic analysis technique.

BACKGROUND ART

A spectroscopic analysis technique of analyzing a sample by irradiating the sample with light and spectroscopically measuring light from the sample that has been subjected to the light irradiation is actively used in the development of new materials and various research. Typical spectroscopic analysis devices are devices that use a dispersion element, such as a diffraction grating.

CITATION LIST

Patent Literature

PTL 1: Japanese Laid-open Patent Publication No. 2013-205390

SUMMARY OF INVENTION

Technical Problem

In spectroscopic analysis devices using a diffraction grating, the orientation of the diffraction grating needs to be changed in accordance with a wavelength range that is measured (sweeping needs to be performed). Therefore, spectroscopic analysis devices of this type are not suited for use in which high-speed spectroscopic analysis needs to be performed.

In spectroscopic analysis devices using a diffraction grating, in order to sufficiently increase measurement SN ratios and to perform measurements with high sensitivity, it is necessary to perform sweeping several times and increase the total amount of light (the amount of light) that is incident upon a light receiver. This point is also a factor that prevents high-speed analysis.

In multichannel-type spectroscopic analysis devices using an area sensor in which many photoelectric conversion elements are arranged in a row, it is not necessary to perform sweeping of a diffraction grating. However, in order to perform analysis at high SN ratios and with high sensitivity, it is necessary to increase the amount of light, and thus the problem that high-speed analysis cannot be performed is not solved.

When spectroscopic analysis is performed by irradiating a sample with light having wavelengths that are absorbed by a large amount by the sample, since the light from the sample that is incident upon the light receiver becomes weak, it is very difficult to perform the analysis at high SN ratios with conventional devices.

On the other hand, in the field of such spectroscopic measurements, in recent years, research using supercontinuum light has been carried out (for example, PTL 1). Supercontinuum light (hereunder abbreviated as SC light) is laser light that is formed when nonlinear effects are produced in laser light and wavelength bands are broadened while its properties as laser light are retained.

In research on spectroscopic measurements using such SC light, analysis of gas-phase samples, such as analysis of gases in the atmosphere, is exclusively performed. Regarding solid-phase samples and liquid-phase samples, research that performs spectroscopic analysis using such SC light is not performed.

Regarding wavelength ranges, almost all research uses a wavelength of 1300 nm or longer (for example, 1300 to 2000 nm), and research using wavelength ranges less than or equal to 1200 nm has not been reported.

According to the investigations of the inventors, when analysis based on an absorption spectrum of a solid-phase sample or an absorption spectrum of a liquid-phase sample is performed, a wavelength range of about 1100 to 1200 nm is particularly effective. For example, when an absorption spectrum is measured by irradiating a thick solid-phase sample with light and capturing the transmitted light, since a large absorption occurs in the wavelength range that is greater than or equal to 1300 nm, the transmitted light becomes too weak, as a result of which analysis often cannot be performed with sufficient precision. In contrast, since, at 1100 to 1200 nm, an overtone absorption occurs often, the absorption becomes weak. Therefore, even if the sample is a thick solid-phase material, the intensity of the transmitted light becomes a certain intensity, and the transmitted light is captured by the light receiver.

However, no research on spectroscopic measurements using SC light has handled the wavelength range of 1100 to 1200 nm, and optimal structures have not been proposed at all. According to the investigations of the inventors, the reason why the wavelength range of 1100 to 1200 nm is not handled is thought to be due to loss occurring at the time of pulse stretching. That is, as disclosed in PTL 1, in order to use SC light in spectroscopic measurements, it is necessary to pass the SC light through a pulse stretching element, such as a dispersion compensating fiber, and broaden a pulse time width (stretch a pulse). Here, it is thought that, in the wavelength range of 1100 to 1200 nm, loss in the fiber is very large, and the pulse cannot be stretched while maintaining an intensity that can endure practical use.

Despite such circumstances, the inventors thought that, by contriving a structure for pulse stretching, even if the wavelength range is 1100 to 1200 nm, it is possible to stretch a pulse with the intensity being somehow maintained, and to perform high-speed spectroscopic analysis using SC light with high precision. Focusing on such a point, research was diligently performed to complete the invention of the present application.

Therefore, an object to be achieved in the invention of the present application is to provide an optimal structure for spectroscopically analyzing a solid-phase sample or a liquid-phase sample in the wavelength range of 1100 to 1200 nm by using SC light.

Solution to Problem

To this end, the invention described in claim 1 of the present application has a structure in which a light source for spectroscopic analysis, which is used when analyzing a solid-phase sample or a liquid-phase sample by irradiating the sample with light and by measuring a spectrum of light from the sample that has been irradiated, includes a pulse laser source;

a nonlinear element that outputs supercontinuum light by producing a nonlinear effect in light from the pulse laser source, the supercontinuum light having a wavelength range including 1100 nm or greater and 1200 nm or less; and a pulse stretching element that broadens a pulse width of the supercontinuum light from the nonlinear element, wherein the pulse stretching element is an element that performs pulse stretching such that a relationship between wavelength and elapsed time within one pulse in the wavelength range of 1100 nm or greater and 1200 nm or less are in a one-to-one correspondence, and that performs the pulse stretching such that time dispersion per 1 nm of wavelength is 10 picoseconds or greater.

To this end, the invention described in claim 2 has a structure in which, in the structure of claim 1 described above, the pulse stretching element is an element that performs the pulse stretching such that a spectral intensity flatness in the wavelength range of 1100 nm or greater and 1200 nm or less is within ±50%.

To this end, the invention described in claim 3 has a structure in which, in the structure of claim 1 or claim 2 described above, the nonlinear element is a photonic crystal fiber or a nonlinear fiber.

To this end, the invention described in claim 4 is such that, in the structure of any one of claims 1 to 3 described above, the pulse stretching element is constituted by a single-mode fiber, a multimode fiber, a diffraction grating, a chirped fiber Bragg grating, or a prism.

To this end, the invention described in claim 5 is such that, in the structure of any one of claims 1 to 3 described above, the pulse stretching element is constituted by a single-mode fiber having a length of 10 km or less.

To this end, the invention described in claim 6 has a structure in which, in the structure of claim 5 described above, a peak illuminance of the supercontinuum light that is incident upon the pulse stretching element is 1 GW/cm$^2$ or less.

To this end, the invention described in claim 7 has a structure that includes the light source for spectroscopic analysis according to any one of claims 1 to 6 that irradiates a solid-phase sample or a liquid-phase sample with light;

a light receiver that is disposed at a position at which the light receiver receives light from the sample irradiated with the light from the light source for spectroscopic analysis, and that detects and outputs an intensity of the light from the sample; and computation means for converting a change over time in the output from the light receiver into a spectrum.

To this end, the invention described in claim 8 has a structure in which a spectroscopic analysis method includes a step of irradiating a solid-phase sample or a liquid-phase sample with light from the light source for spectroscopic analysis according to any one of claims 1 to 6;

a step of receiving by a light receiver light from the sample that has been subjected to the light irradiation and causing the light receiver to output an intensity of the light; and a step of converting a change over time in the output from the light receiver into a spectrum by computation.

Advantageous Effects of Invention

As described below, according to the inventions described in the claims of the present application, since a sample is irradiated with SC light, serving as light for spectroscopic analysis, it is possible to perform high-speed spectroscopic analysis at high SN ratios and with high sensitivity. Since it is possible to include the wavelength range of 1100 to 1200 nm as the band for spectroscopic analysis, it is possible to perform analysis from overtone absorption of molecular vibration in this band, and to perform high-speed spectroscopic analysis at high SN ratios and with high sensitivity in this band.

According to the invention described in claim 2, in addition to providing the advantageous effect above, since the spectral intensity flatness in the wavelength range of 1100 nm or greater and 1200 nm or less is within ±50%, it is possible to perform spectroscopic analysis with high precision in this band without a reduction in the precision of the analysis due to a dynamic range.

BRIEF DESCRIPTION OF DRAWINGS

FIG. 4 is a schematic view illustrating a structure of an analysis program that is included in spectroscopic analysis software.

DESCRIPTION OF EMBODIMENTS

Embodiments for carrying out the invention of this application are described below.

Figure 1:
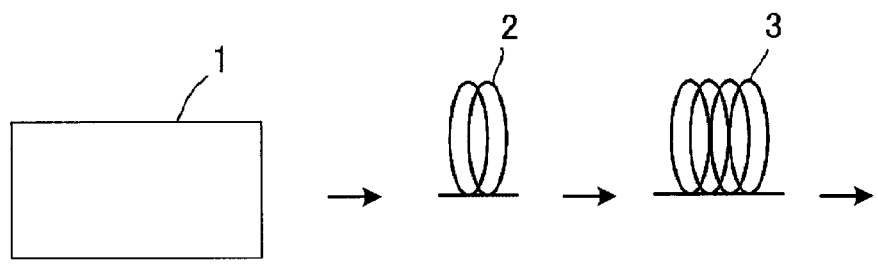
FIG. 1 is a schematic view of a light source for spectroscopic analysis according to an embodiment.

FIG. 1 is a schematic view of a light source for spectroscopic analysis according to an embodiment. The light source for spectroscopic analysis of the embodiment is a light source configured particularly for spectroscopic analysis of a solid-phase sample or a liquid-phase sample, and is used for spectroscopic analysis performed by irradiating a sample with light having a wavelength range of 1100 to 1200 nm and detecting the intensity of light from the sample.

Specifically, the light source for spectroscopic analysis of the embodiment is one that outputs SC light having a sufficient intensity and spectral intensity flatness over the wavelength range of 1100 to 1200 nm. More specifically, the light source includes a pulse laser source 1, a nonlinear element 2 that outputs SC light by producing nonlinear effects in light from the pulse laser source 1, and a pulse stretching element 3 that broadens the pulse width of the SC light from the nonlinear element 2.

Note that the spectral intensity flatness here is, in the wavelength range of 1100 to 1200 nm, a quantity that is given by $\{(S_{max}-S_{min})/(S_{max}+S_{min})\}\lambda 100(\%)$, where the maximum intensity is $S_{max}$ and the minimum intensity is $S_{min}$. Therefore, a spectral intensity flatness that is within 50% means that $S_{max}$ is within three times $S_{min}$.

Although, as the pulse laser source 1, various devices can be used, for example, a gain switch laser, a microchip laser, or a fiber laser may be used. Note that the pulse laser source 1 does not necessarily need to have an oscillation wavelength within the wavelength range of 1100 to 1200 nm. This is because, when SC light is generated by the nonlinear element 2, light having the wavelength range of 1100 to 1200 nm may be newly generated.

As the nonlinear element 2, a fiber is often used. For example, a photonic crystal fiber or other types of nonlinear fibers can be used as the nonlinear element 2. Although, as a fiber mode, a single mode is often used, as long as sufficient nonlinear characteristics are exhibited, even a multimode fiber can be used as the nonlinear element 2.

Although, as the pulse stretching element 3, a fiber is also often used, elements other than fiber may be used as the pulse stretching element. As the fiber, a single-mode fiber or a multimode fiber can be used. As elements other than the fiber, as described below, for example, an element using a diffraction grating or a chirped fiber Bragg grating (CFBG) can be used.

Figure 2:
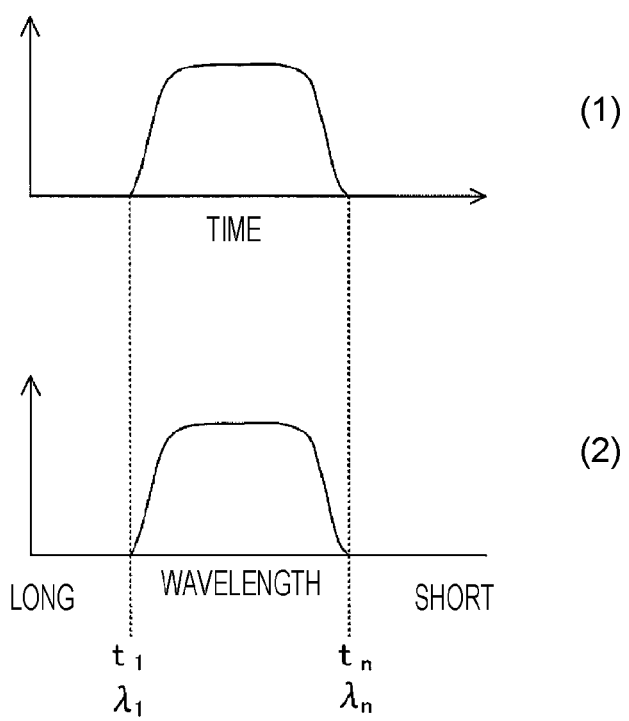
FIG. 2 schematically illustrates, in the light source for spectroscopic analysis of the embodiment, the relationship between time and wavelength within a pulse of SC light after pulse stretching.
Figure 2:
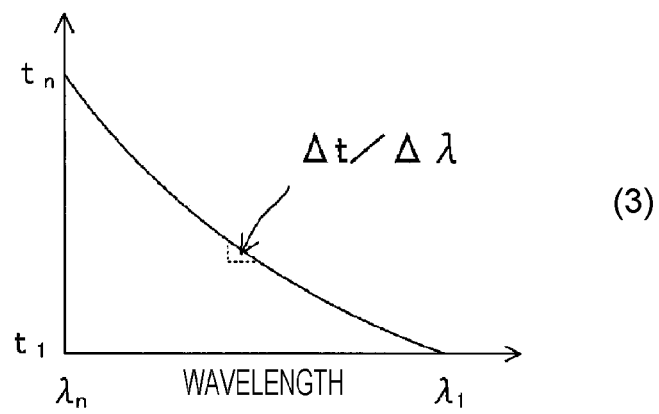

What is important regarding the characteristics of the pulse stretching element 3 is that the SC light be stretched such that the relationship between elapsed time and wavelength in one pulse are in a one-to-one correspondence. This point is described below. FIG. 2 schematically illustrates, in the light source for spectroscopic analysis of the embodiment, the relationship between elapsed time and wavelength within a pulse of SC light after pulse stretching. FIG. 2(1) illustrates intensity with respect to the elapsed time within one pulse, and FIG. 2(2) illustrates intensity at each wavelength. FIG. 2(3) illustrates the relationship between the elapsed time and the wavelength within the pulse.

As illustrated in FIGS. 2(1) to (3), the SC light after the pulse stretching is such that the elapsed time and the wavelength within one pulse are in a one-to-one correspondence. That is, when a rise time of one pulse is $t_1$ and an end time of the pulse is $t_n$, light having a longest wavelength $\lambda_1$ exists at an initial stage of the rising of the one pulse. As time elapses, the wavelength of the existing light shifts toward a short-wavelength side. Just before the end time $t_n$ of the pulse, light having a shortest wavelength $\lambda_n$ exists. In this way, since the wavelength and the elapsed time within the pulse are in a one-to-one correspondence, when the elapsed time is determined from the pulse start time $t_1$ and the intensity of the light is obtained, this intensity is the intensity at a particular wavelength. That is, the intensity at each elapsed time is the intensity at each wavelength, and this is nothing but a spectrum.

Although such a uniqueness between the elapsed time and the wavelength is, as described below, important, in particular, in spectroscopic analysis of the embodiment that determines a spectrum by a change over time in an output from a light receiver, the rate of change in the wavelength with respect to the elapsed time is also important. This point consists in at what time lag (time dispersion), a difference of 1 nm of wavelength exists, and is given by $\Delta t/\Delta \lambda$ in FIG. 2(3). In the light source for spectroscopic analysis of the embodiment, when $\Delta \lambda$ is 1 nm, $\Delta t$ is 10 picoseconds or greater.

Note that, when a fiber is used as the pulse stretching element 3, as described below, each characteristic of the pulse stretching element 3 above can be realized by selecting a fiber having an appropriate dispersion characteristic, or using a fiber having an appropriate length.

Next, embodiments of an invention of a spectroscopic analysis device and an invention of a spectroscopic analysis method are described.

Figure 3:
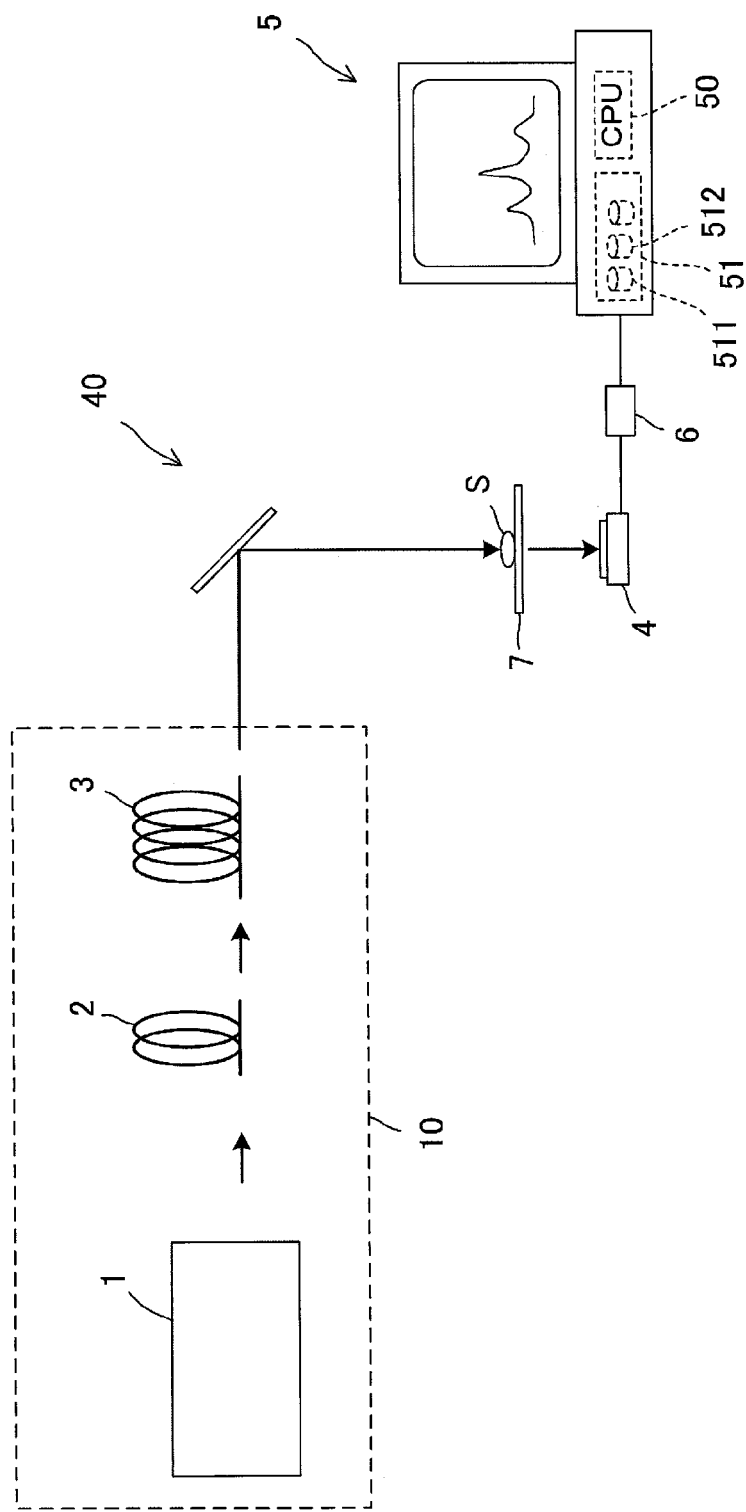
FIG. 3 is a schematic view of a spectroscopic analysis device according to an embodiment.

FIG. 3 is a schematic view of a spectroscopic analysis device according to an embodiment. The spectroscopic analysis device illustrated in FIG. 3 includes a light source 10 that is disposed at a position at which the light source 10 is capable of irradiating a sample with light, a light receiver 4 that is disposed at a position at which the light receiver 4 receives light from the sample that has been subjected to the light irradiation, and computation means 5 for processing an output from the light receiver 4.

As the light source 10, the light source for spectroscopic analysis of the embodiment above is used. A sample S is placed on a support plate 7 made of a material having high transmittance with respect to near-infrared rays. If necessary, an optical system 40 that irradiates the sample S on the support plate 7 with the light from the light source 10 is provided.

The light receiver 4 is disposed on a light-exiting side of the support plate 7. As the light receiver 4, a photodiode is used. A photodiode having a high-speed response in a band of about 0.1 to 10 GHz can be desirably used.

As the computation means 5, a general-purpose PC including a processor 50 and a storage 51 can be used. Spectroscopic analysis software is installed in the storage 51, and includes, for example, an analysis program 511 including a code that converts a change over time in the output from the light receiver 4 into a spectrum, and reference spectral data 512 that is used in calculating a spectrum. Note that an AD converter 6 is provided between the light receiver 4 and the general-purpose PC, and the output of the light receiver 4 is converted into digital data by the AD converter 6 and is input to the general-purpose PC.

FIG. 4 is a schematic view illustrating a structure of the analysis program that is included in the spectroscopic analysis software. The example in FIG. 4 is an example of a structure for measuring absorption spectrum (spectral absorptance).

The reference spectral data is a value for each wavelength, and is a reference for calculating absorption spectrum. The reference spectral data is obtained by causing light from the light source for spectroscopic analysis to be incident upon the light receiver 4 without passing through a sample. That is, the light is caused to be directly incident upon the light receiver 4 without passing through the sample, an output of the light receiver 4 is input to the general-purpose PC via the AD converter 6, and a value for each time resolution $\Delta t$ is obtained. The values are stored as reference intensities at times $(t_1, t_2, t_3, \ldots)$ for every $\Delta t$ $(V_1, V_2, V_3, \ldots)$.

The reference intensities $V_1, V_2, V_3, \ldots$ at the times $t_1, t_2, t_3, \ldots$ are intensities (spectra) at respective wavelengths $\lambda_1, \lambda_2, \lambda_3, \ldots$. The relationship between the times $t_1, t_2, t_3, \ldots$ and the wavelengths within one pulse is previously examined, and the values $V_1, V_2, V_3, \ldots$ at the times are handled as the values at the respective $\lambda_1, \lambda_2, \lambda_3, \ldots$.

When light that has passed through the sample S is caused to be incident upon the light receiver 4, outputs from the light receiver 4 pass through the AD converter 6 and are similarly stored as values (measured values) $(v_1, v_2, v_3, \ldots)$ at the respective times $t_1, t_2, t_3, \ldots$ in a memory. The measured values are compared with the pieces of reference spectral data $(v_1/V_1, v_2/V_2, v_3/V_3, \ldots)$, and the results thereof become absorption spectra (strictly speaking, values obtained by dividing from 100%).

The analysis program is programmed such that arithmetic processing such as that described above is performed. Note that, in the example in FIG. 4, it looks as if the absorption spectra are only examined. However, actually, by examining the absorption spectra, the proportion of components of the sample may be analyzed or the sample may be determined.

Next, a more desirable structure of the light source for spectroscopic analysis that realizes such spectroscopic analysis is described in detail.

Figure 5:
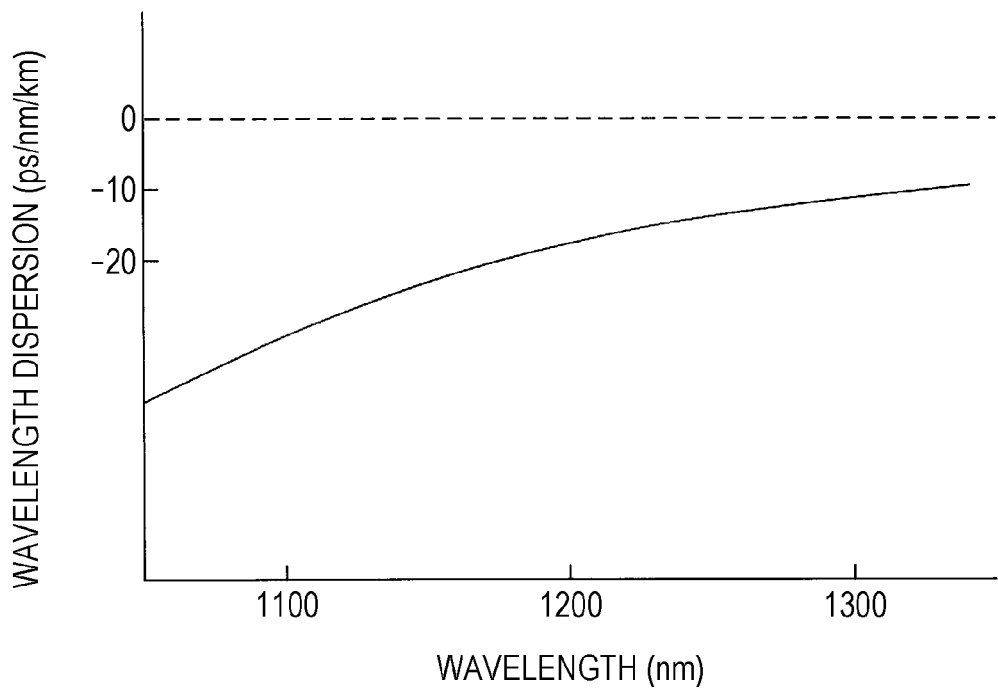
FIG. 5 is a schematic view illustrating an example of a dispersion characteristic of a fiber used as a pulse stretching element.

FIG. 5 is a schematic view illustrating an example of a dispersion characteristic of a fiber used as the pulse stretching element 3. The fiber serving as the pulse stretching element 3 desirably does not include zero dispersion in at least the wavelength range of 1100 to 1200 nm. That is, in the wavelength range of 1100 to 1200 nm, the characteristic of the fiber is desirably completely a normal dispersion characteristic or completely an abnormal dispersion characteristic. FIG. 5 illustrates an example of a fiber having a normal dispersion characteristic.

When, in the wavelength range of 1100 to 1200 nm, zero dispersion is included, two or more wavelengths correspond to the same time, and unintended nonlinear optical effects are easily produced. Therefore, the above-described uniqueness between the time and the wavelength may no longer be satisfied. It is desirable to use a fiber that exhibits normal dispersion rather than abnormal dispersion in the wavelength range of 1100 to 1200 nm. SC light is often characterized by light on a long-wavelength side exiting first and light on a short-wavelength side exiting next. In this case, a pulse of the SC light is such that light having a long wavelength exists at an initial stage and then the wavelength shifts toward the short-wavelength side as time elapses. When a fiber having a normal dispersion characteristic is used as the pulse stretching element 3, the light on the short-wavelength side is further delayed compared with the light on the long-wavelength side, as a result of which the temporal relationship above is maintained and the pulse is brought into a further stretched state. Therefore, it is possible to easily obtain a long pulse light with the uniqueness between the time and the wavelength being satisfied.

Note that it is possible to use, as the pulse stretching element 3, a fiber exhibiting abnormal dispersion in the wavelength range of 1100 to 1200 nm. In this case, since SC light is dispersed with light on the long-wavelength side that has existed in the initial stage of the pulse being delayed and light on the short-wavelength side that has existed at a later time traveling, the temporal relationship within one pulse is reversed, as a result of which the light on the short-wavelength side exists in the initial stage of the one pulse, and the pulse is stretched with light existing more toward the long-wavelength side as time elapses. However, compared with normal dispersion, it is often necessary to further increase the propagation distance for stretching the pulse, as a result of which loss is easily increased. Therefore, due to this point, normal dispersion is desirable.

According to the research carried out by the inventors, in particular, when the wavelength range of 1100 to 1200 nm is used, it is desirable that the length of the fiber used as the pulse stretching element 3 be 10 km or less from the viewpoint of increasing the precision of the analysis. This point is described with reference to FIG. 6.

Figure 6:
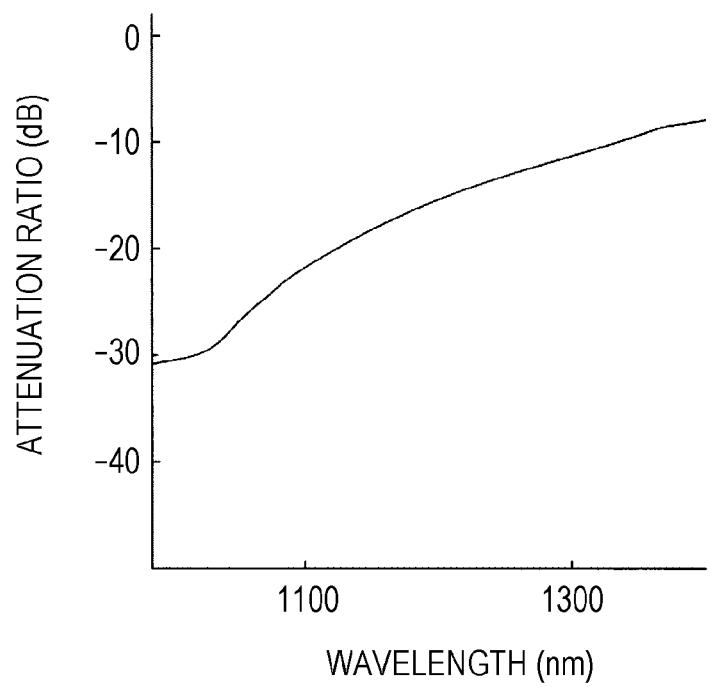
FIG. 6 is a schematic view illustrating an example of pulse stretching by a fiber.

FIG. 6 is a schematic view illustrating an example of pulse stretching by a fiber. In the example in FIG. 6, a dispersion compensating fiber SMFDK-S made by Furukawa Electric Co., Ltd. and having a length of 11 km is used to stretch a pulse. The horizontal axis in FIG. 6 indicates wavelength, and the vertical axis in FIG. 6 indicates attenuation ratio in dB with respect to input.

Although, when a pulse is stretched by a fiber, light is inevitably attenuated by a certain degree, the problem, as illustrated in FIG. 6, is that the attenuation ratio differs greatly in the range of 1100 to 1200 nm. That is, in this example, at 1200 nm, the attenuation is about −16 dB, whereas, at 1100 nm, the attenuation is about −21 dB. The difference is as large as 5 dB. When such a difference between the attenuation ratios exists, even if light rays having the same intensity are input, a large output difference occurs after the pulse has been stretched. When such light rays are used to perform spectroscopic analysis, the precision of the analysis is easily reduced due to a dynamic range of the light receiver 4.

In contrast, even when a similar dispersion compensating fiber is used, if its length is about 3 km, the attenuation ratio is approximately −3 dB in the wavelength range of 1100 to 1200 nm. Therefore, the dynamic range is not so large, and thus the precision of the analysis is not reduced.

According to the research carried out by the inventors, in the case in which a fiber is used as the pulse stretching element 3, in general, when the length exceeds 10 km, a large difference between attenuation ratios occurs in the wavelength range of 1100 to 1200 nm, and affects the precision of the analysis. Therefore, the length is desirably 10 km or less, and is more desirably 5 km or less.

In such a light source for spectroscopic analysis of the embodiment, in order to make it possible to perform the analysis with high precision, the magnitude of a peak illuminance of SC light that is incident upon the pulse stretching element 3 is also an important parameter. The research carried out by the inventors showed that causing the peak illuminance of SC light to be 1 GW (gigawatt)/cm$^2$ or less is very important from the viewpoint of maintaining the uniqueness between the time and the wavelength. This point is described below.

Figure 7:
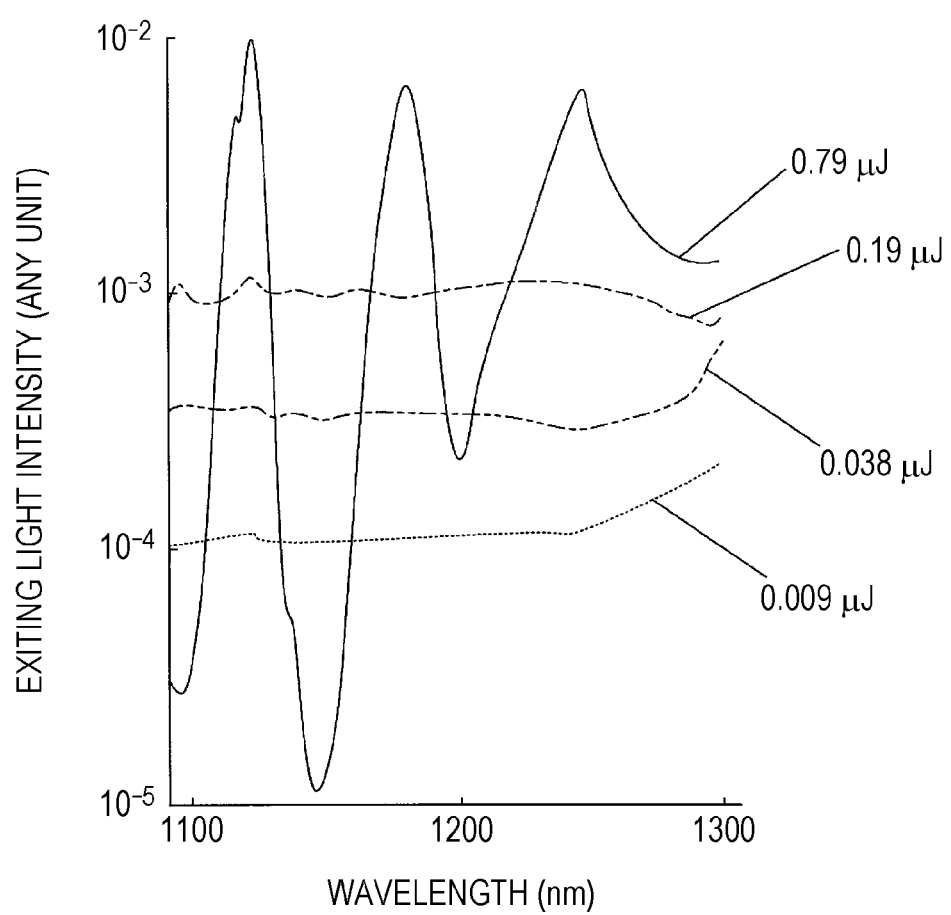
FIG. 7 illustrates confirmed experiment results regarding disturbance in output light when SC light having a high peak value has been subjected to pulse stretching.

The peak illuminance of SC light that is incident upon the pulse stretching element 3 is an effective illuminance at an incident surface of the pulse stretching element 3, and is the highest illuminance (illuminance at all wavelengths) in an elapsed time within one pulse. "Effective illuminance" refers to the illuminance of effective light in terms of the light being incident upon and propagating through the pulse stretching element 3. FIG. 7 illustrates confirmed experiment results regarding disturbance in output light when SC light having a high peak value has been subjected to pulse stretching. In FIG. 7, the vertical axis indicates a logarithmic scale.

In the experiment whose results are illustrated in FIG. 7, microchip laser light having a center wavelength of 1064 nm and a pulse width of two nanoseconds is caused to enter a photonic crystal fiber, serving as the nonlinear element 2, is defined as SC light, and is subjected to pulse stretching by a single-mode fiber having a length of 5 km. The single-mode fiber is a fiber exhibiting normal dispersion in the range of 1100 to 1200 nm. Here, the energy of the SC light incident upon the single-mode fiber is changed to be 0.009 μJ, 0.038 μJ, 0.19 μJ, and 0.79 μJ.

As illustrated in FIG. 7, up to the energy of 0.19 μJ of the incident SC light, there are no large variations in the intensity of exiting light in the wavelength range of 1100 to 1200 nm, whereas, at 0.79 μJ, there are drastic variations in the intensity of exiting light in accordance with wavelength. Such variations are thought to indicate that, when SC light is incident upon and is being propagated through the single-mode fiber, serving as the pulse stretching element 3, unintended nonlinear effects are further produced in the SC light. When such drastic variations occur, as described above, the precision of the analysis is reduced due to the dynamic range. In addition, when such unintended nonlinear effects are produced, the uniqueness between the time and the wavelength is also decreased. Even from this point, the precision of the analysis is reduced.

In the experiment whose results are illustrated in FIG. 7, since the pulse width of the incident SC light is unchanged, this means that the peak value has been changed. In this case, according to the research carried out by the inventors, when the peak value is 300 W or greater, such unintended nonlinear effects are easily produced. Since the diameter of a mode field of the fiber, serving as the pulse stretching element 3, is about 6 µm, it is desirable that, in general, the peak illuminance of incident light be 1 GW/cm$^2$ or less.

According to such a light source for spectroscopic analysis, such a spectroscopic analysis device, or such a spectroscopic analysis method of the embodiments, since a sample is irradiated with SC light, serving as light for spectroscopic analysis, it is possible to perform high-speed spectroscopic analysis with high sensitivity. That is, although SC light is light whose band is broadened by nonlinear effects, a sample can be efficiently irradiated with light having high energy. Therefore, even if a sample needs to be irradiated with pulse light several times, measurements can be performed at higher speeds than conventional measurements. Since high-luminance irradiation is possible, it is particularly suitable for spectroscopically analyzing a solid-phase sample or a liquid-phase sample whose absorption is generally larger than that of a gas-phase sample. "High-illumination irradiation is possible" means that, even with regard to a sample having large absorption, a relatively intense transmitted light can reach the light receiver, and that spectroscopic analysis can be performed with high sensitivity.

Since it is possible to include the wavelength range of 1100 to 1200 nm as the band for spectroscopic analysis, it is possible to analyze overtone absorption of molecular vibration in this band, and to perform high-speed spectroscopic analysis at high SN ratios and with high sensitivity in this band. Here, since the spectral intensity flatness in the wavelength range of 1100 nm or greater and 1200 nm or less is within ±50%, it is possible to perform the spectroscopic analysis with high precision in this band without a reduction in the precision of the analysis due to the dynamic range.

Here, since the time dispersion magnitude $\Delta t/\Delta \lambda$ in the uniqueness between the time and the wavelength is 10 picoseconds or greater, the structure is one in which a wavelength resolution of 1 nm or greater in the response speed of a practical detecting system can be realized. That is, although a signal output period of the light receiver 4 and the processing speed of the AD converter 6 determine the response speed of the detecting system, the limit is about 10 picoseconds. Therefore, with $\Delta t/\Delta \lambda$ being set at 10 picoseconds or greater, it is possible to provide a practical structure that is capable of realizing a wavelength resolution of 1 nm or greater.

Since SC light having a high peak illuminance is not incident upon the pulse stretching element, the possibility of the uniqueness between the time and the wavelength of output light being no longer satisfied due to unintended nonlinear effects and the possibility of the spectral intensity flatness being reduced to the limit or a value past the limit are reduced. In order to obtain this effect, as described above, it is desirable that the peak illuminance of SC light that is incident upon the pulse stretching element be 1 GW/cm$^2$ or less.

EXAMPLES

Next, some examples pertaining to the embodiments above are described.

Figure 8:
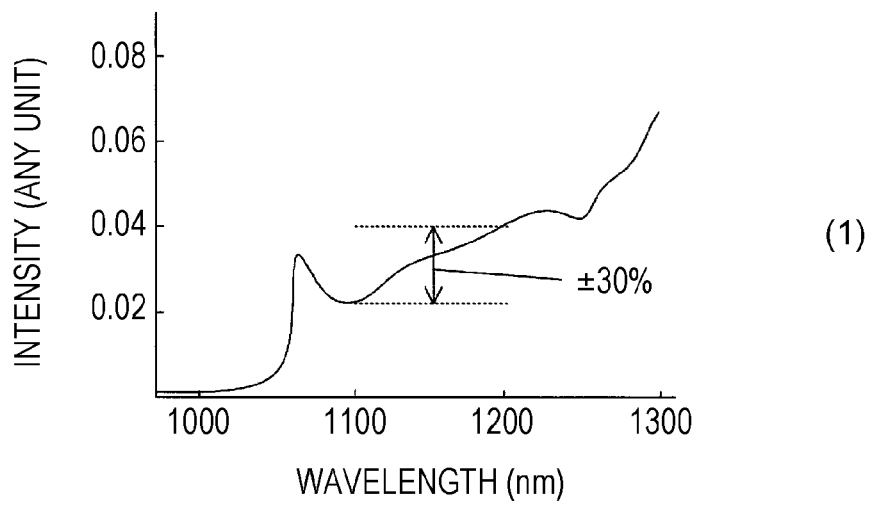
FIG. 8 is a schematic view illustrating output characteristics of a light source for spectroscopic analysis of Example 1.
Figure 8:
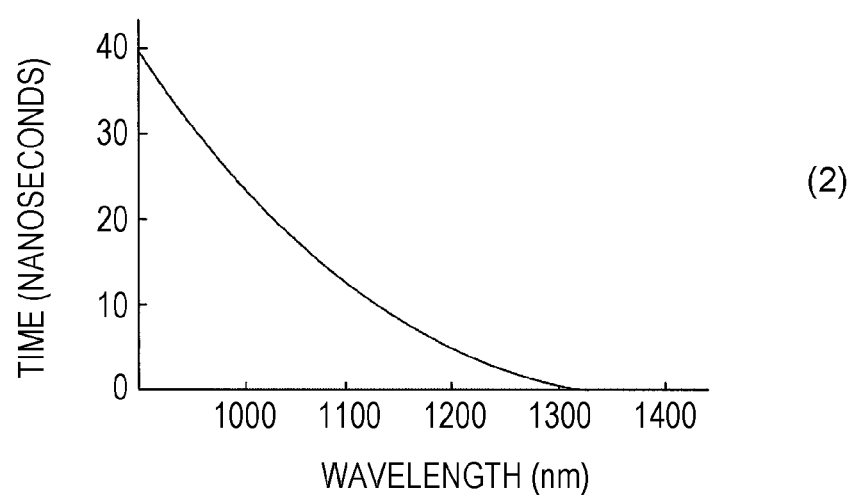

FIG. 8 is a schematic view illustrating output characteristics of a light source for spectroscopic analysis of Example 1. In Example 1, as the pulse laser source 1, a gain switch laser (having a center wavelength of 1060 nm, a pulse width of 100 picoseconds, a repetition frequency of 1 MHz, and an average power of 200 mW) was used. Light from the pulse laser source 1 was caused to be incident upon a nonlinear fiber, serving as the nonlinear element 2, to generate SC light, and the generated SC light was subjected to pulse stretching by a fiber allowing single-mode propagation and exhibiting normal dispersion (−10 ps/nm/km or less) in the range of 1100 to 1200 nm. The length of the fiber was 3 km. FIG. 8(1) illustrates the relationship between wavelength and intensity after the pulse stretching in this example, and FIG. 8(2) illustrates the relationship between wavelength and time.

As illustrated in FIG. 8(1), according to this example, in the range of 1100 to 1200 nm, the spectral intensity flatness is about ±30%, and thus a spectral intensity flatness within ±50% is obtained. FIG. 8(2) illustrates that, according to this example, the dispersion per 1 nm is about 80 picoseconds, and the uniqueness between the time and the wavelength is obtained in a dispersed state at 10 picoseconds/nm or greater.

Figure 9:
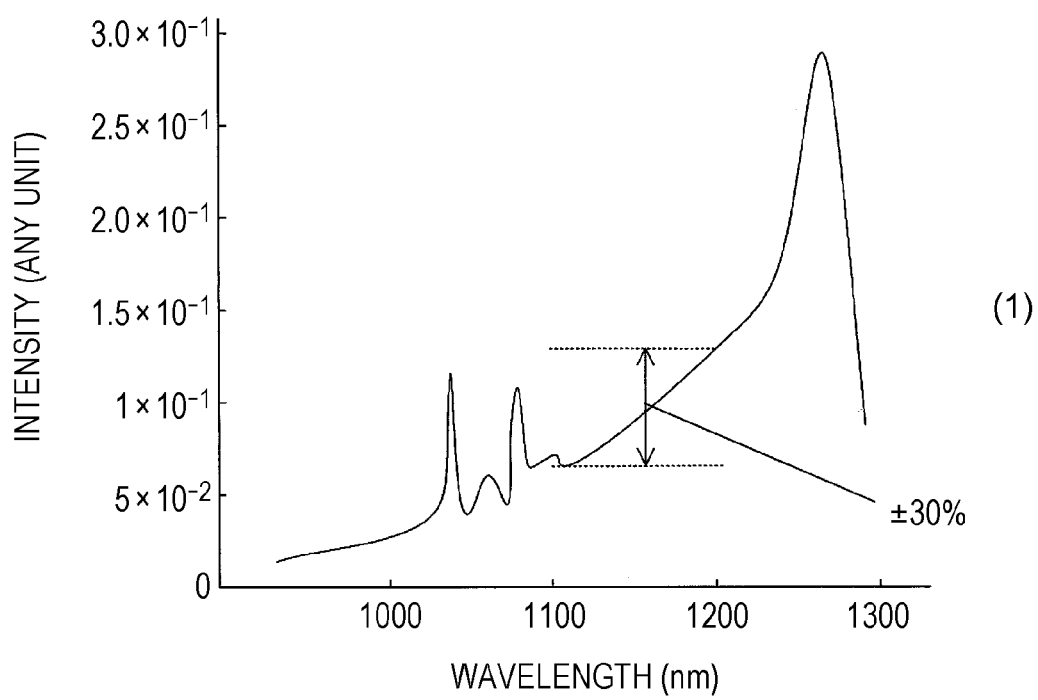
FIG. 9 is a schematic view illustrating output characteristics of a light source for spectroscopic analysis of Example 2.
Figure 9:
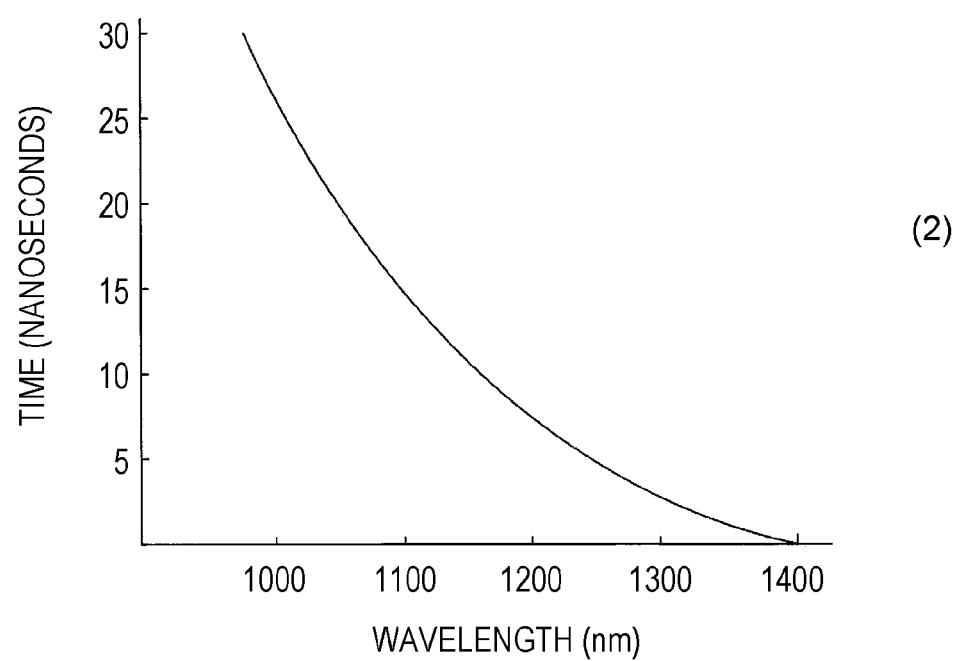

FIG. 9 is a schematic view illustrating output characteristics of a light source for spectroscopic analysis of Example 2. In Example 2, as the pulse laser source 1, a microchip laser (having a center wavelength of 1064 nm, a pulse width of 2 nanoseconds, a repetition frequency of 20 kHz, and an average power of 100 mW) was used. Light from the pulse laser source 1 was caused to be incident upon a photonic crystal fiber, serving as the nonlinear element 2, to generate SC light. The SC light was caused to be incident upon a fiber, serving as the pulse stretching element 3, allowing single-mode propagation and exhibiting normal dispersion (−10 ps/nm/km or less) in the range of 1100 to 1200 nm, and was subjected to pulse stretching. The length of the fiber was 3 km.

FIG. 9(1) illustrates the relationship between wavelength and intensity after pulse stretching in this example, and FIG. 9(2) illustrates the relationship between wavelength and time.

As illustrated in FIG. 9(1), according to this example, in the range of 1100 to 1200 nm, the spectral intensity flatness is similarly about ±30%, and thus a spectral intensity flatness within 50% is obtained. FIG. 9(2) illustrates that, according to this example, the dispersion per 1 nm in the range of 1100 to 1200 nm is similarly about 80 picoseconds, and the uniqueness between the time and the wavelength in a dispersed state at 10 picoseconds/nm or greater is obtained.

Although not illustrated, a Yb fiber laser (having a center wavelength of 1060 nm, a pulse width of 2 picoseconds, a repetition frequency of 1 MHz, and an average power of 10 mW) was used as the pulse laser source 1, and light from the laser source was caused to be incident upon a nonlinear fiber to generate SC light. When this SC light was similarly subjected to pulse stretching by a single-mode fiber exhibiting normal dispersion, similarly, the uniqueness between the time and wavelength was realized with the spectral intensity flatness being within 50% and the dispersion being 10 picoseconds/nm or greater in the range of 1100 to 1200 nm.

Figure 10:
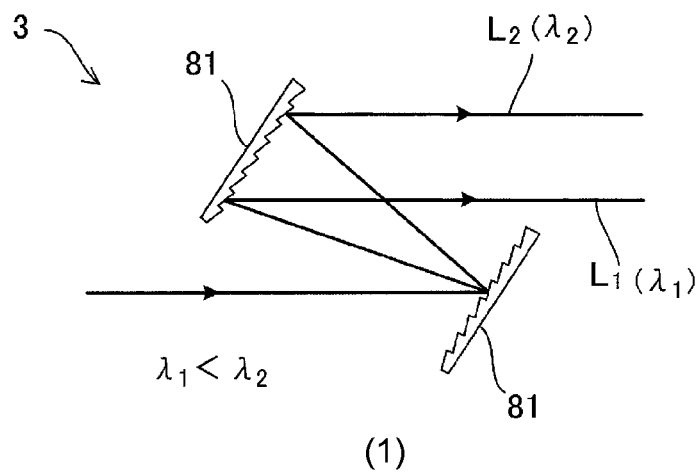
FIG. 10 is a schematic view illustrating another example of a pulse stretching element.
Figure 10:
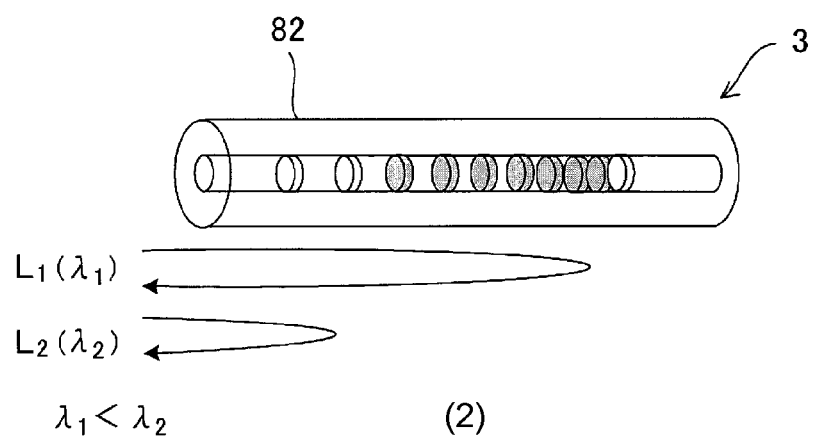
Figure 10:
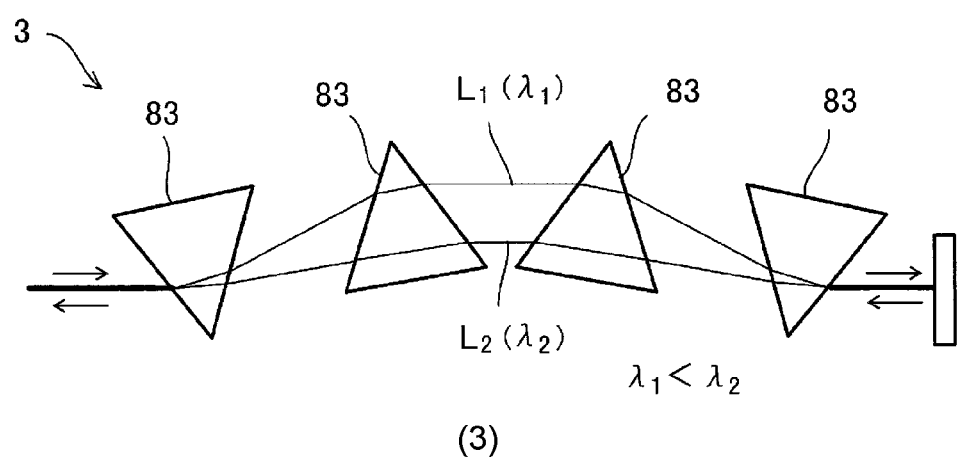

Next, another example of the pulse stretching element 3 is described with reference to FIG. 10. FIG. 10 is a schematic view illustrating another example of the pulse stretching element 3. The pulse stretching element 3 can be constituted by using something other than a fiber, such as a diffraction grating, a chirped fiber Bragg grating (CFBG), or a prism. For example, as illustrated in FIG. 10(1), two diffraction gratings 81 are used for causing wavelength dispersion. Here, differences between optical paths occur in accordance with wavelength, and a pulse is stretched with the uniqueness between the time and the wavelength being realized. In this example, the longer the wavelength of light is, the shorter the optical paths are.

As illustrated in FIG. 10(2), it is also possible to stretch a pulse by using a CFBG82. FBGs are fibers in which a diffraction grating is constituted by periodically providing parts whose refractive indices change in a core length direction. Among such FBGs, the CFBG82 is one in which reflection positions become positions that differ in accordance with wavelength such that a chirped mirror function is realized by using the fiber. When the CFBG82 is used as the pulse stretching element 3, in the CFBG82, a refractive index varying layer in a core is formed such that, in incident light, for example, light on a long-wavelength side is reflected on a near side in a propagation direction in the fiber and returns, and, as the short-wavelength side is approached, light is reflected on a far side and returns. This structure is equivalent to that of normal dispersion fibers. Since the closer the wavelength is to the short-wavelength side, the more the returning of the light is delayed, the uniqueness between the time and the wavelength is similarly ensured.

Further, as illustrated in FIG. 10(3), it is possible to stretch a pulse by using prisms 83. In this example, the pulse stretching element 3 is constituted by using four prisms 83 and by disposing them such that, the closer the wavelength is to the short-wavelength side, the longer the optical paths are. Even, in this example, since the closer the wavelength is to the short-wavelength side, the more the light is delayed in reaching the light receiver 4, the uniqueness between the time and the wavelength is similarly ensured.

In the examples illustrated in FIGS. 10(1) to (3), differences between optical paths occur when light goes back. As a structure for taking out light in a return path, a structure in which a combination of a polarization beam splitter and a ¼ wavelength plate is disposed at an optical path on a near side of the pulse stretching element 3 can be used. Regarding an outward path, light propagates through the polarization beam splitter and the ¼ wavelength plate in this order and is incident upon the pulse stretching element 3, and, regarding the return path, light that has returned from the pulse stretching element 3 propagates through the ¼ wavelength plate and the polarization beam splitter in this order.

Note that, although, in each embodiment above, spectroscopic analysis is described as being performed by causing light that has passed through a sample to be incident upon the light receiver 4, spectroscopic analysis may be performed by causing light reflected by a sample to be incident upon the light receiver. The reflected light may be light other than light reflected at a surface of the sample. That is, the reflected light may be internally reflected light (interactance reflected light).

As a structure of the spectroscopic analysis device and the spectroscopic analysis method, an optical system for reference that causes light from the light source 10 to be incident upon the light receiver without passing through the sample S may be provided. In this case, spectroscopic analysis may also be performed by obtaining reference spectral data in real time by using a structure that splits light from the light source 10 into measurement light and reference light by, for example, a beam splitter, and that detects the intensity of the measurement light and the intensity of the reference light by the light receiver.

REFERENCE SIGNS LIST

1 pulse laser source
2 nonlinear element
3 pulse stretching element
4 light receiver
5 computation means
6 AD converter
7 support plate

The invention claimed is:

1. A light source for spectroscopic analysis, which is used when analyzing a solid-phase sample or a liquid-phase sample by irradiating the sample with light and by measuring a spectrum of light from the sample that has been irradiated, the light source comprising:
   a pulse laser source;
   a nonlinear element connected to the pulse laser source for outputting supercontinuum light by producing a nonlinear effect in light from the pulse laser source, the supercontinuum light having a wavelength range including 1100 nm or greater and 1200 nm or less; and
   a pulse stretching element connected to the nonlinear element for broadening a pulse width of the supercontinuum light from the nonlinear element,
   wherein the pulse stretching element is an element that performs pulse stretching such that a relationship between wavelength and elapsed time within one pulse in the wavelength range of 1100 nm or greater and 1200 nm or less are in a one-to-one correspondence, and that performs the pulse stretching such that time dispersion per 1 nm of wavelength is 10 picoseconds or greater.

2. The light source for spectroscopic analysis according to claim 1, wherein the pulse stretching element is an element that performs the pulse stretching such that a spectral intensity flatness in the wavelength range of 1100 nm or greater and 1200 nm or less is within ±50%.

3. The light source for spectroscopic analysis according to claim 2, wherein the nonlinear element is a photonic crystal fiber or a nonlinear fiber.

4. The light source for spectroscopic analysis according to claim 2, wherein the pulse stretching element is constituted by a single-mode fiber, a multimode fiber, a diffraction grating, a chirped fiber Bragg grating, or a prism.

5. The light source for spectroscopic analysis according to claim 2, wherein the pulse stretching element is constituted by a single-mode fiber having a length of 10 km or less.

6. The light source for spectroscopic analysis according to claim 1, wherein the nonlinear element is a photonic crystal fiber or a nonlinear fiber.

7. The light source for spectroscopic analysis according to claim 1, wherein the pulse stretching element is constituted by a single-mode fiber, a multimode fiber, a diffraction grating, a chirped fiber Bragg grating, or a prism.

8. The light source for spectroscopic analysis according to claim 1, wherein the pulse stretching element is constituted by a single-mode fiber having a length of 10 km or less.

9. The light source for spectroscopic analysis according to claim 8, wherein a peak illuminance of the supercontinuum light that is incident upon the pulse stretching element is 1 $GW/cm^2$ or less.

10. A spectroscopic analysis device comprising:
a light source further including:
  a pulse laser source;
  a nonlinear element connected to the pulse laser source for outputting supercontinuum light by producing a nonlinear effect in light from the pulse laser source, the supercontinuum light having a wavelength range including 1100 nm or greater and 1200 nm or less; and
  a pulse stretching element connected to the nonlinear element for broadening a pulse width of the supercontinuum light from the nonlinear element,
wherein the pulse stretching element is an element that performs pulse stretching such that a relationship between wavelength and elapsed time within one pulse in the wavelength range of 1100 nm or greater and 1200 nm or less are in a one-to-one correspondence, and that performs the pulse stretching such that time dispersion per 1 nm of wavelength is 10 picoseconds or greater, where the light source is disposed at a position at which the light source is capable of irradiating a solid-phase sample or a liquid-phase sample with light;
a light receiver that is disposed at a position at which the light receiver receives light from the sample irradiated with the light from the light source for spectroscopic analysis, and that detects and outputs an intensity of the light from the sample as an output signal; and
a computer connected to the light receiver for converting a change over time in the output signal from the light receiver into a spectrum.

11. The spectroscopic analysis device according to claim 10, wherein the pulse stretching element is an element that performs the pulse stretching such that a spectral intensity flatness in the wavelength range of 1100 nm or greater and 1200 nm or less is within ±50%.

12. A spectroscopic analysis method comprising:
a step of irradiating a solid-phase sample or a liquid-phase sample with light from a light source used for spectroscopic analysis, the light source including:
  a pulse laser source;
  a nonlinear element that connected to the pulse laser for outputs outputting supercontinuum light by producing a nonlinear effect in light from the pulse laser source, the supercontinuum light having a wavelength range including 1100 nm or greater and 1200 nm or less; and
  a pulse stretching element that connected to the nonlinear element for broadens broadening a pulse width of the supercontinuum light from the nonlinear element,
wherein the pulse stretching element is an element that performs pulse stretching such that a relationship between wavelength and elapsed time within one pulse in the wavelength range of 1100 nm or greater and 1200 nm or less are in a one-to-one correspondence, and that performs the pulse stretching such that time dispersion per 1 nm of wavelength is 10 picoseconds or greater;
a step of receiving by a light receiver light from the sample that has been subjected to the light irradiation and causing the light receiver to output an intensity of the light as an output signal; and
a step of converting a change over time in the output signal from the light receiver into a spectrum by computation.

13. The spectroscopic analysis method according to claim 12 where the pulse stretching element is an element that performs the pulse stretching such that a spectral intensity flatness in the wavelength range of 1100 nm or greater and 1200 nm or less is within ±50%.

* * * * *